(12) United States Patent
Heo et al.

(10) Patent No.: US 10,778,985 B2
(45) Date of Patent: Sep. 15, 2020

(54) METHOD AND APPARATUS FOR INTRA PREDICTION IN VIDEO CODING SYSTEM

(71) Applicant: LG Electronics Inc., Seoul (KR)

(72) Inventors: Jin Heo, Seoul (KR); Eunyong Son, Seoul (KR); Junghak Nam, Seoul (KR); Seungwook Park, Seoul (KR); Sehoon Yea, Seoul (KR)

(73) Assignee: LG Electronics Inc., Seoul (KR)

( * ) Notice: Subject to any disclaimer, the term of this patent is extended or adjusted under 35 U.S.C. 154(b) by 176 days.

(21) Appl. No.: 15/762,958

(22) PCT Filed: Sep. 23, 2016

(86) PCT No.: PCT/KR2016/010669
§ 371 (c)(1),
(2) Date: Mar. 23, 2018

(87) PCT Pub. No.: WO2017/052272
PCT Pub. Date: Mar. 30, 2017

(65) Prior Publication Data
US 2018/0310000 A1 Oct. 25, 2018

Related U.S. Application Data

(60) Provisional application No. 62/222,221, filed on Sep. 23, 2015.

(51) Int. Cl.
*G06K 9/36* (2006.01)
*G06K 9/46* (2006.01)
(Continued)

(52) U.S. Cl.
CPC .......... *H04N 19/159* (2014.11); *H04N 19/11* (2014.11); *H04N 19/176* (2014.11); *H04N 19/46* (2014.11);
(Continued)

(58) Field of Classification Search
None
See application file for complete search history.

(56) References Cited

U.S. PATENT DOCUMENTS 9,100,621 B2 * 8/2015 Jeon ........................ H04N 19/86
9,661,332 B2 * 5/2017 Jeon ....................... H04N 19/117
(Continued)

FOREIGN PATENT DOCUMENTS

KR 10-2011-0116025 10/2011
KR 10-2013-0029130 3/2013
(Continued)

*Primary Examiner* — Randolph I Chu
(74) *Attorney, Agent, or Firm* — Fish & Richardson P.C.

(57) ABSTRACT

An image decoding method, which is performed by a decoding apparatus, includes the steps of: deriving a frequency domain-neighboring block for a neighboring block of a current block in a spatial domain; deriving a frequency domain-prediction block for the current block by applying a prediction pattern to the frequency domain-neighboring block; generating a frequency domain-reconstructed block for the current block on the basis of the frequency domain-prediction block; and generating a reconstructed block for the current block in the spatial domain on the basis of the frequency inverse transform of the frequency domain-reconstructed block. The present invention can generate a prediction block for a current block in a frequency domain, and accordingly can more efficiently reconstruct a complex image.

18 Claims, 10 Drawing Sheets

(51) Int. Cl.
    *H04N 19/159*     (2014.01)
    *H04N 19/176*     (2014.01)
    *H04N 19/11*     (2014.01)
    *H04N 19/46*     (2014.01)
    *H04N 19/61*     (2014.01)
    *H04N 19/593*     (2014.01)
    *H04N 19/146*     (2014.01)

(52) U.S. Cl.
    CPC ........... *H04N 19/593* (2014.11); *H04N 19/61* (2014.11); *H04N 19/146* (2014.11)

(56) References Cited

U.S. PATENT DOCUMENTS 9,832,472 B2 *   11/2017   Jeon ..................... H04N 19/159
  10,469,844 B2 *   11/2019   Jeon ..................... H04N 19/159
2014/0044166 A1     2/2014   Xu et al.

FOREIGN PATENT DOCUMENTS

KR     10-2013-0126928     11/2013
KR     10-2015-0081240     7/2015

* cited by examiner

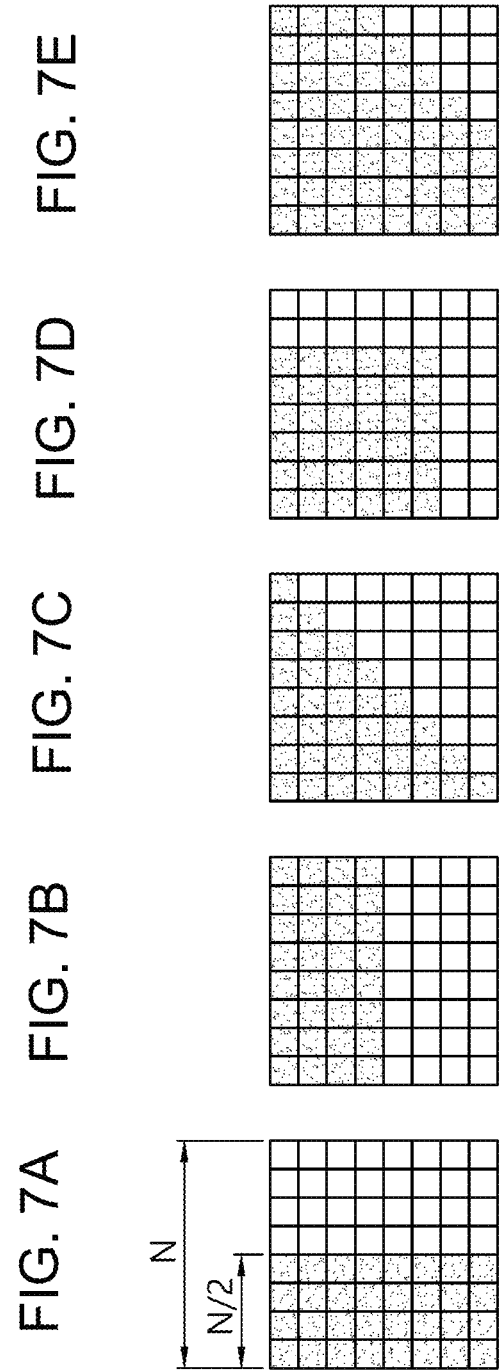

METHOD AND APPARATUS FOR INTRA PREDICTION IN VIDEO CODING SYSTEM

CROSS-REFERENCE TO RELATED APPLICATIONS

This application is a National Stage application under 35 U.S.C. § 371 of International Application No. PCT/KR2016/010669, filed Sep. 23, 2016, which claims the benefit of U.S. Application No. 62/222,221, filed on Sep. 23, 2015. The disclosures of the prior applications are incorporated by reference in their entirety.

BACKGROUND

Field of the Invention

The present invention relates to a video coding technique, and more specifically, to an intra-prediction method and device in a video coding system.

Related Art

A demand for high-resolution and high-quality images, such as high definition (HD) images and ultra-high definition (UHD) images, has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

An object of the present invention is to provide a method and device for improving image coding efficiency.

An object of the present invention is to provide a method and apparatus for improving efficiency of intra prediction.

Another object of the present invention is to provide an efficient image decoding method and apparatus based on an intra prediction mode in a frequency domain.

Another object of the present invention is to provide a prediction pattern derivation method and apparatus for deriving a more precise frequency domain prediction block.

Another object of the present invention is to provide a method and apparatus for deriving a more precise prediction pattern while reducing computational complexity by selecting a prediction pattern candidate derived based on a neighbor block.

In accordance with an embodiment of the present invention, there is provided an image decoding method performed by a decoding apparatus. The method includes the steps of deriving a frequency domain neighbor block for a neighbor block of a current block in a spatial domain, deriving a frequency domain prediction block for the current block by applying a prediction pattern to the frequency domain neighbor block, generating a frequency domain reconstruction block for the current block based on the frequency domain prediction block, and generating a reconstruction block for the current block in the spatial domain based on frequency inverse transform for the frequency domain reconstruction block.

In accordance with another embodiment of the present invention, there is provided a decoding apparatus performing image decoding. The apparatus includes a transform unit deriving a frequency domain neighbor block for a neighbor block of a current block in a spatial domain, a transform block processing unit deriving a frequency domain prediction block for the current block by applying a prediction pattern to the frequency domain neighbor block and generating a frequency domain reconstruction block for the current block based on the frequency domain prediction block, and an inverse transform unit generating a reconstruction block for the current block in the spatial domain based on frequency inverse transform for the frequency domain reconstruction block.

In accordance with yet another embodiment of the present invention, there is provided an image encoding method performed by an encoding apparatus. The method includes the steps of generating a frequency domain original block by performing frequency transform on a current block of a spatial domain, deriving a frequency domain neighbor block for a neighbor block of the current block, determining a prediction pattern of the current block, deriving a frequency domain prediction block for the current block by applying the prediction pattern to the frequency domain neighbor block, generating frequency domain residual information based on the frequency domain original block and the frequency domain prediction block, and encoding information about a prediction mode of the current block and the frequency domain residual information and outputting the encoded information.

In accordance with yet another embodiment of the present invention, there is provided an encoding apparatus performing image encoding. The apparatus includes a transform unit generating a frequency domain original block by performing frequency transform on a current block of a spatial domain and deriving a frequency domain neighbor block for a neighbor block of the current block, a transform block processing unit determining a prediction pattern of the current block, deriving a frequency domain prediction block for the current block by applying the prediction pattern to the frequency domain neighbor block, and generating frequency domain residual information based on the frequency domain original block and the frequency domain prediction block, and an entropy encoding unit encoding information about a prediction mode of the current block and the frequency domain residual information and outputting the encoded information.

In accordance with the present invention, a prediction block for a current block in a frequency domain can be generated, and the decoding of a complicated image can become more efficient through the prediction block.

In accordance with the present invention, a prediction pattern can be derived based on neighbor blocks, and a prediction block similar to a current block can be derived through the prediction pattern. Accordingly, the amount of data of frequency residual information of a current block can be obviated or reduced and overall coding efficiency can be improved.

BRIEF DESCRIPTION OF THE DRAWINGS

FIGS. 7A-7E illustrate an example of various prediction patterns for the processing of a frequency domain neighbor block.

DETAILED DESCRIPTION

Figure 1:
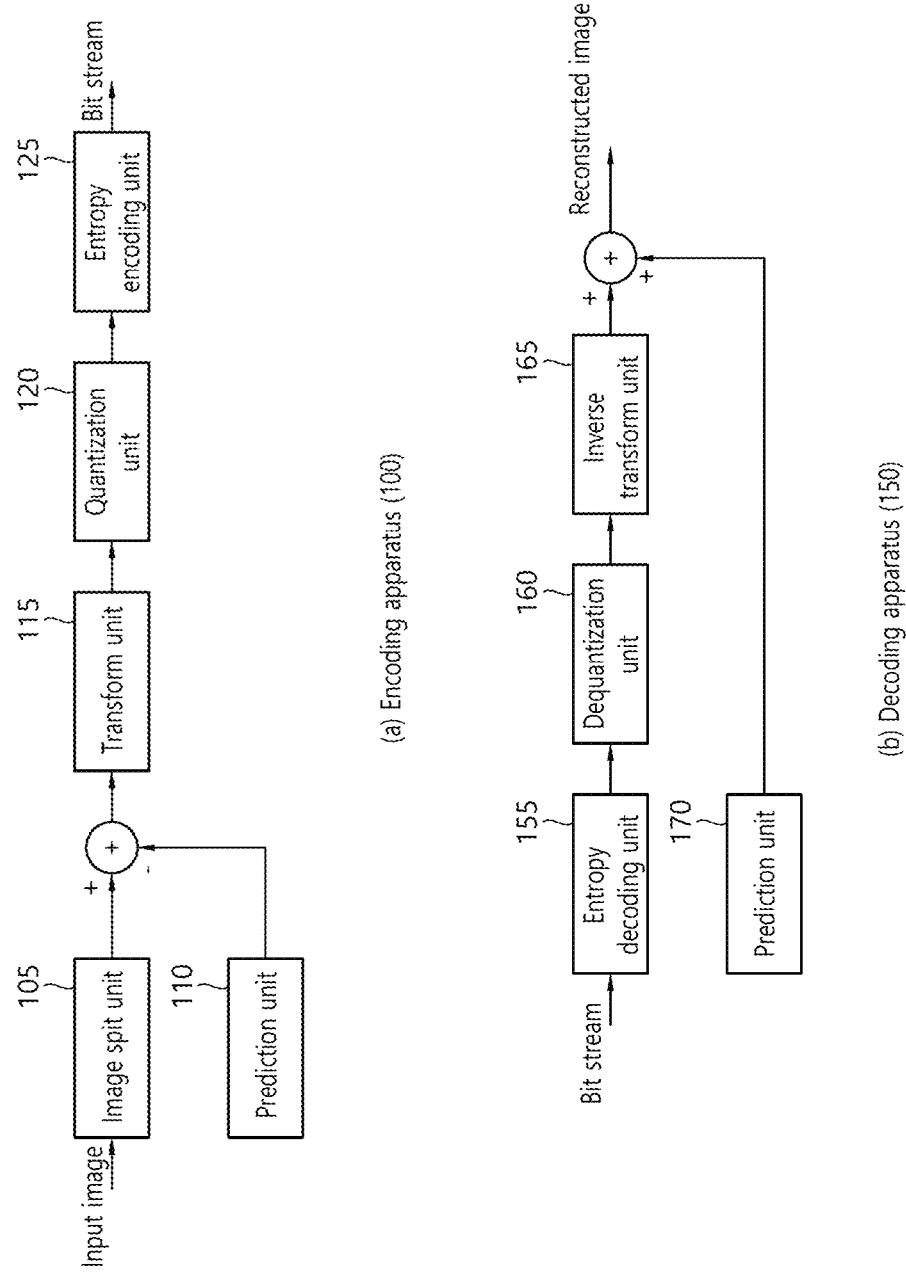
FIG. 1 is a block diagram schematically showing an embodiment of a video encoding apparatus and decoding apparatus.

The present invention may be modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently.

The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions of video encoder/decoder, and do not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, embodiments of the present invention will be described in detail with reference to the accompanying drawings.

FIG. 1 is a block diagram schematically showing an embodiment of a video encoding apparatus and decoding apparatus.

Referring to FIG. 1(a), the encoding apparatus 100 may include an image spit unit 105, a prediction unit 110, a transform unit 115, a quantization unit 120, and an entropy encoding unit 125. Furthermore, although not shown, the encoding apparatus 100 may further include a rearrangement unit, a dequantization unit, an inverse transform unit, a filter unit, and memory. The image spit unit may include a picture split unit. The entropy encoding unit 125 may be called an entropy coding unit, and the encoding apparatus 100 may be called a coder.

The picture split unit may split an input picture into at least one processing unit block. In this case, a block as a processing unit may be a prediction unit (PU), may be a transform unit (TU) or may be a coding unit (CU). A picture may consist of a plurality of coding tree units (CTUs). Each CTU may be split into CUs in a quad-tree structure. A CU may be split into CUs of a deeper depth in a quad-tree structure. A PU and a TU may be obtained from a CU. For example, a PU may be partitioned from a CU in a symmetrical or asymmetrical rectangle structure. Furthermore, a TU may be split from a CU in a quad-tree structure.

As will be described later, the prediction unit 110 includes an inter prediction unit performing inter prediction and an intra prediction unit performing intra prediction. The prediction unit 110 generates a prediction block including a prediction sample (or prediction sample array) by performing prediction on the processing unit of a picture in the picture split unit. The processing unit of a picture in the prediction unit 110 may be a CU, may be a TU or may be a PU. Furthermore, the prediction unit 110 determines whether prediction performed on a corresponding processing unit is inter prediction or intra prediction, and may determine the detailed contents (e.g., a prediction mode) of each prediction method. In this case, a processing unit in which prediction is performed, a prediction method, and a processing unit in which the detailed contents of the prediction method are determined may be different. For example, a prediction method and a prediction mode may be determined to be a PU unit, and the execution of prediction may be performed in a TU unit.

A prediction block may be generated by performing prediction based on information of at least one of a picture prior to a current picture and/or a picture after the current picture through inter prediction. Furthermore, a prediction block may be generated by performing prediction based on pixel information within a current picture through intra prediction.

A skip mode, a merge mode or advance motion vector prediction (AMVP) may be used as a method of inter prediction. In inter prediction, a reference picture may be selected with respect to a PU, a reference block corresponding to the PU may be selected. A reference block may be selected in an integer pixel (or sample) or a fraction pixel (or sample) unit. Next, a prediction block whose residual signal with a PU is minimized and whose motion vector size is also minimized is generated.

A prediction block may be generated in an integer pixel unit or may be generated in a pixel unit of an integer or less, such as a ½ pixel unit or a ¼ pixel unit. In this case, a motion vector may also be expressed in a unit of an integer pixel or less. A prediction block generated by the prediction unit 110 may be a prediction block generated in a spatial domain.

Information, such as the index, motion vector difference (MDV), motion vector predictor (MVP) and residual signal of a reference picture selected through inter prediction, may be subjected to entropy encoding and transmitted to the decoding apparatus. If the skip mode is applied, a residual may not be generated, transformed, quantized or transmitted because a prediction block may be used as a reconstruction block.

If intra prediction is performed, the prediction may be performed in a PU unit because a prediction mode is determined in a PU unit. Furthermore, a prediction mode may be determined in a PU unit, and the intra prediction may be performed in a TU unit.

In intra prediction, a prediction mode may have 33 directional prediction modes and at least two non-directional modes, for example. The non-directional mode may include a DC prediction mode and a planar mode.

In intra prediction, a prediction block may be generated after a filter is applied to a reference sample. A prediction block generated by the prediction unit 110 may be a prediction block generated in a spatial domain. In this case, whether or not to apply the filter to the reference sample may be determined based on the intra prediction mode and/or size of a current block.

A residual value (residual block or residual signal) between a generated prediction block and the original block is input to the transform unit 115. Furthermore, prediction mode information, motion vector information, etc. used for prediction, together with the residual value, is encoded by the entropy encoding unit 130 and delivered to the decoding apparatus.

The transform unit 115 performs transform on the residual block in a transform block unit and generates a transform coefficient.

A transform block is a square block of samples and is a block to which the same transform is applied. The transform block may be a transform unit (TU) and may have a quad-tree structure.

The transform unit 115 may perform transform based on a prediction mode applied to the residual block and the size of the block.

For example, if intra prediction has been applied to the residual block and the block is a residual array of 4×4, the residual block may be transformed using discrete sine transform (DST).

In other cases, the residual block may be transformed using discrete cosine transform (DCT).

The transform unit 115 may generate a transform block of transform coefficients by transform.

Specifically, the transform unit 115 may generate temporary transform coefficients (or primary transform coefficients) by applying primary transform on the residual signal (or residual block) from the spatial domain to the frequency domain based on DST or DCT, and may generate transform coefficients (or secondary transform coefficients) by applying rotational transform as secondary transform on the temporary transform coefficients.

The quantization unit 120 may generate a quantized transform coefficient by quantizing residual values transformed by the transform unit 115, that is, the transform coefficients. A value calculated by the quantization unit 120 is provided to the dequantization unit and the rearrangement unit.

The rearrangement unit rearranges the quantized transform coefficients provided by the quantization unit 120. Encoding efficiency in the entropy encoding unit 125 can be improved by rearranging the quantized transform coefficients.

The rearrangement unit may rearrange the quantized transform coefficients of a two-dimensional block form in a primary vector form through a coefficient scanning method.

The entropy encoding unit 125 may output a bit stream by entropy-coding a symbol according to a probability distribution based on the quantized transform values rearranged by the rearrangement unit or an encoding parameter value calculated in a coding process. The entropy encoding method is a method of receiving a symbol having various values and expressing the symbol in a string of decodable binary numbers while removing statistical redundancy.

In this case, the symbol means an encoding/decoding target syntax element, a coding parameter and the value of a residual signal. The encoding parameter is a parameter necessary for encoding and decoding, and may include information that may be inferred in an encoding or decoding process in addition to information that is encoded by the encoding apparatus and delivered to the decoding apparatus, such as a syntax element. The encoding parameter means information necessary to encode or decode an image. The encoding parameter may include values or statistics, for example, an intra/inter prediction mode, a moving/motion vector, a reference image index, a coding block pattern, whether a residual signal is present or not, a transform coefficient, a quantized transform coefficient, a quantization parameter, a block size, and block split information. Furthermore, the residual signal may mean a difference between the original signal and a prediction signal. Furthermore, the residual signal may mean a signal of a form in which a difference between the original signal and a prediction signal has been transformed or a signal of a form in which a difference between the original signal and a prediction signal has been transformed and quantized. The residual signal may be called a residual block in a block unit and may be called a residual sample in a sample unit.

If entropy encoding is applied, a symbol is expressed in such a manner that a small number of bits is allocated to a symbol having a high occurrence probability and a large number of bits is allocated to a symbol having a low occurrence probability, thereby being capable of reducing the size of a bit string for symbols to be encoded. Accordingly, compression performance of video encoding can be improved through entropy encoding.

For the entropy encoding, an encoding method, such as exponential Golomb, context-adaptive variable length coding (CAVLC) or context-adaptive binary arithmetic coding (CABAC), may be used. For example, the entropy encoding unit 125 may store a table for performing entropy encoding, such as a variable length coding/code (VLC) table. The entropy encoding unit 125 may perform entropy encoding using the stored variable length coding (VLC) table. Furthermore, the entropy encoding unit 125 may derive a method of binarizing a target symbol and the probability model of a target symbol/bin, and may perform entropy encoding using the derived binarization method or probability model.

Furthermore, the entropy encoding unit 125 may apply a specific change to a transmitted parameter set or syntax, if necessary.

The dequantization unit dequantizes the values (quantized transform coefficients) quantized by the quantization unit 120. The inverse transform unit inverse transforms the values dequantized by the dequantization unit.

The residual value (or residual sample or residual sample array) generated by the dequantization unit and the inverse transform unit and the prediction block predicted by the prediction unit 110 may be added to generate a reconstruction block including a reconstructed sample (or reconstructed sample array).

In FIG. 1, the residual block and the prediction block have been illustrated as being added through the adder to generate the reconstruction block. In this case, the adder may be considered to be a separate unit (reconstruction block generation unit) that generates the reconstruction block.

The filter unit may apply a deblocking filter, an adaptive loop filter (ALF) or a sample adaptive offset (SAO) to a reconstruction picture.

The deblocking filter may remove distortion generated at the boundary of blocks in the reconstruction picture. The adaptive loop filter (ALF) may perform filtering based on a value obtained by comparing an image reconstructed after a block is filtered through the deblocking filter with the original image. The ALF may be performed only if high efficiency is applied. The SAO reconstructs an offset difference between a residual block to which the deblocking filter has been applied and the original image in a pixel unit, and is applied in a form, such as a band offset or an edge offset.

Meanwhile, the filter unit may not apply filtering on a reconstruction block used for inter prediction.

The memory may store the reconstruction block or picture calculated through the filter unit. The reconstruction block or picture stored in the memory may be provided to the prediction unit 110 that performs inter prediction.

Referring to FIG. 1(b), the video decoding apparatus 150 may include an entropy decoding unit 155, a rearrangement unit, a dequantization unit 160, an inverse transform unit 165, and a prediction unit 170. Furthermore, although not shown, the video decoding apparatus 150 may further include a filter unit and memory. The entropy decoding unit 155 may be called an entropy decoder, and the decoding apparatus 150 may be called a decoder.

When an image bit stream is input from the video encoding apparatus, the input bit stream may be decoded according to a procedure in which image information is processed in the video encoding apparatus.

The entropy decoding unit 155 may generate symbols including a symbol of a quantized coefficient form by entropy-decoding the input bit stream based on a probability distribution. An entropy decoding method is a method of receiving a string of binary numbers and generating symbols. The entropy decoding method is similar to the aforementioned entropy encoding method.

For example, if a variable length coding (hereinafter referred to as "VLC"), such as CAVLC, has been used to perform entropy encoding in the video encoding apparatus, the entropy decoding unit 155 may implement the same VLC table as a VLC table used in the encoding apparatus, and may perform entropy decoding. Furthermore, if CABAC has been used to perform entropy encoding in the video encoding apparatus, the entropy decoding unit 155 may perform entropy decoding using CABAC in accordance with the entropy encoding.

More specifically, the CABAC entropy decoding method may include receiving a bin corresponding to each syntax element in a bit stream, determining a context model using decoding target syntax element information and decoding information of a neighbor block and a block to be decoded or information of a symbol/bin decoded in a previous step, and generating a symbol corresponding to the value of each syntax element by predicting the occurrence probability of a bin based on the determined context model and performing arithmetic decoding on the bin. In this case, in the CABAC entropy decoding method, after the context model is determined, a context model may be updated using information of a symbol/bin decoded for the context model of a next symbol/bin.

Information that belongs to information decoded by the entropy decoding unit 155 and that is used to generate a prediction block may be provided to the prediction unit 170. A residual value, that is, a quantized transform coefficient on which entropy decoding has been performed in the entropy decoding unit 155, may be input to the rearrangement unit.

The rearrangement unit may rearrange information of the bit stream subjected to entropy decoding in the entropy decoding unit 155, that is, the quantized transform coefficients, based on the rearrangement method used in the encoding apparatus.

The rearrangement unit may rearrange the coefficients expressed in a one-dimensional vector form by reconstructing them into coefficients of a two-dimensional block form. The rearrangement unit may generate a coefficient (quantized transform coefficient) array of a two-dimensional block form by performing scanning on coefficients based on a prediction mode applied to a current block (transform block) and the size of a transform block.

The dequantization unit 160 may perform dequantization based on a quantization parameter provided by the encoding apparatus and the coefficient value of the rearranged block.

The inverse transform unit 165 may perform inverse rotational transform and inverse transform on transform and rotational transform performed by the transform unit of the encoding apparatus with respect to the quantization results performed in the video encoding apparatus.

The inverse rotational transform and inverse transform may be performed based on a transmission unit determined in the encoding apparatus or a split unit of an image. In the transform unit of the encoding apparatus, DCT and/or DST may be selectively performed based on a plurality of pieces of information, such as a prediction method, the size of a current block and a prediction direction. The inverse transform unit 165 of the decoding apparatus may perform inverse rotational transform and inverse transform based on transform information performed by the transform unit of the encoding apparatus. The inverse rotational transform and the inverse transform may also be simply called rotational transform and transform from a viewpoint of the decoding apparatus 150.

The prediction unit 170 may generate a prediction block including a prediction sample (or prediction sample array) based on prediction block generation-related information provided by the entropy decoding unit 155 and a previously decoded block and/or picture information provided by the memory.

If a prediction mode for a current PU is an intra prediction mode, intra prediction that generates a prediction block may be performed based on pixel information within a current picture.

If a prediction mode for a current PU is an inter prediction mode, inter prediction for the current PU may be performed based on information included in at least one of pictures before or after a current picture. In this case, motion information necessary for the inter prediction of the current PU and provided by the video encoding apparatus, for example, a motion vector, information about a reference picture index, etc. may be derived in accordance with a skip flag or a merge flag received from the encoding apparatus by checking the skip flag or the merge flag.

When performing the inter prediction on the current picture, the prediction block may be generated so that a residual signal with a current block is minimized and a motion vector size is also minimized. The prediction block generated by the prediction unit 170 may be a prediction block generated in a spatial domain.

Meanwhile, a motion information derivation method may be different depending on a prediction mode of a current block. A prediction mode applied for inter prediction may include an advanced motion vector prediction (AMVP) mode and a merge mode.

For example, if the merge mode is applied, the encoding apparatus and the decoding apparatus may generate a merge candidate list using the motion vector of a reconstructed spatial neighbor block and/or a motion vector corresponding to a Col block, that is, a temporal neighbor block. In the merge mode, the motion vector of a candidate block selected in a merge candidate list is used as the motion vector of a current block. The encoding apparatus may transmit a merge index indicative of a candidate block that is selected from candidate blocks included in the merge candidate list and that has an optimal motion vector to the decoding apparatus. In this case, the decoding apparatus may derive the motion vector of a current block using the merge index.

For another example, if the advanced motion vector prediction (AMVP) mode is applied, the encoding apparatus and the decoding apparatus may generate a motion vector predictor candidate list using the motion vector of a reconstructed spatial neighbor block and/or a motion vector corresponding to a Col block, that is, a temporal neighbor block. That is, the motion vector of the reconstructed spatial neighbor block and/or the motion vector corresponding to the Col block, that is, a temporal neighbor block, may be used as a motion vector candidate. The encoding apparatus may transmit a prediction motion vector index that is selected from motion vector candidates included in the list and that has an optimal motion vector to the decoding apparatus. In this case, the decoding apparatus may select the prediction motion vector of a current block from the motion vector candidates included in the motion vector candidate list using the motion vector index.

The encoding apparatus may calculate a motion vector difference (MVD) between the motion vector (MV) of a current block and a motion vector predictor (MVP), may encode the MVD, and may transmit the encoded MVD to the decoding apparatus. That is, the MVD may be calculated as a value obtained by subtracting the MVP from the MV of the current block. In this case, the decoding apparatus may decode a received motion vector difference and derive the motion vector of the current block by adding the decoded motion vector difference and the motion vector predictor.

Furthermore, the encoding apparatus may transmit a reference picture index indicative of a reference picture to the decoding apparatus.

The decoding apparatus may predict the motion vector of a current block using motion information of neighbor blocks and derive a motion vector for the current block using a residual received from the encoding apparatus. The decoding apparatus may generate a prediction block for the current block based on the derived motion vector and the reference picture index information received from the encoding apparatus.

For another example, if the merge mode is applied, the encoding apparatus and the decoding apparatus may generate a merge candidate list using motion information of a reconstructed neighbor block and/or motion information of a Col block. That is, the encoding apparatus and the decoding apparatus may use motion information of the reconstructed neighbor block and/or the Col block as a merge candidate for the current block if the motion information is present.

The encoding apparatus may select a merge candidate that belongs to merge candidates included in a merge candidate list and that is capable of providing optimal encoding efficiency as motion information for a current block. In this case, a merge index indicative of the selected merge candidate may be included in a bit stream and transmitted to the decoding apparatus. The decoding apparatus may select one of the merge candidates included in the merge candidate list using the received merge index, and may determine the selected merge candidate to be motion information of the current block. Accordingly, if the merge mode is applied, motion information corresponding to a reconstructed neighbor block and/or a Col block may be used as motion information of the current block without any change. The decoding apparatus may reconstruct the current block by adding a prediction block and a residual transmitted by the encoding apparatus.

In the aforementioned AMVP and merge mode, in order to derive motion information of a current block, motion information of a reconstructed neighbor block and/or motion information of a Col block may be used.

In the case of the skip mode, that is, one of other modes used for inter prediction, information of a neighbor block may be used in a current block without any change. Accordingly, in the case of the skip mode, the encoding apparatus does not transmit syntax information, such as a residual, to the decoding apparatus other than information indicating that motion information of which block will be used as motion information of a current block.

The encoding apparatus and the decoding apparatus may generate the prediction block of the current block by performing motion compensation on the current block based on the derived motion information. In this case, the prediction block may mean a motion-compensated block generated as the results of the motion compensation performed on the current block. Furthermore, a plurality of motion-compensated block may form a single motion-compensated image.

A reconstruction block may be generated using a prediction block generated by the prediction unit 170 and a residual block provided by the inverse transform unit 165. In FIG. 1, the adder has been illustrated as adding a prediction block and a residual block to generate a reconstruction block. In this case, the adder may be considered to be a separate unit (reconstruction block generation unit) that generates the reconstruction block. In this case, as described above, the reconstruction block may include a reconstructed sample (or reconstructed sample array), the prediction block may include a prediction sample (or prediction sample array), and the residual block may include a residual sample (or residual sample array). Accordingly, the reconstructed sample (or reconstructed sample array) may be expressed as being generated by adding a corresponding prediction sample (or prediction sample array) and the residual sample (residual sample array).

A residual is not transmitted with respect to a block to which the skip mode is applied, and a prediction block may become a reconstruction block.

A reconstructed block and/or picture may be provided to the filter unit. The filter unit may apply deblocking filtering, a sample adaptive offset (SAO) and/or an ALF to a reconstructed block and/or picture.

The memory may store a reconstruction picture or block so that it is used as a reference picture or reference block, and may also provide a reconstruction picture to an output unit.

Elements that belong to the entropy decoding unit 155, the rearrangement unit, the dequantization unit 160, the inverse transform unit 165, the prediction unit 170, the filter unit, and the memory included in the decoding apparatus 150 and that are directly related to the decoding of an image, for example, the entropy decoding unit 155, the rearrangement unit, the dequantization unit 160, the inverse transform unit 165, the prediction unit 170, and the filter unit may be expressed as a decoder or decoding unit differently from other elements.

Furthermore, the decoding apparatus 150 may further include a parsing unit (not shown) that parses information related to an encoded image included in a bit stream. The parsing unit may include the entropy decoding unit 155 and may be included in the entropy decoding unit 155. The parsing unit may be implemented as one element of the decoding unit.

If the intra prediction mode is applied to a current block in a current video coding system as in the aforementioned contents, intra prediction for generating a prediction block based on neighbor reference samples of a current block may be performed. The prediction block generated by performing the intra prediction may be a prediction block in a spatial domain. However, as the complexity of an image increases, it is more efficient to generate a prediction block in the frequency domain than to generate a prediction block in the spatial domain and to perform encoding/decoding. Accordingly, the present invention proposes a method of generating an optimal prediction block of a current block in the frequency domain, generating a reconstruction block in the frequency domain, and generating the reconstruction block of the current block in the spatial domain based on frequency inverse transform for the reconstruction block in the frequency domain.

Figure 2:
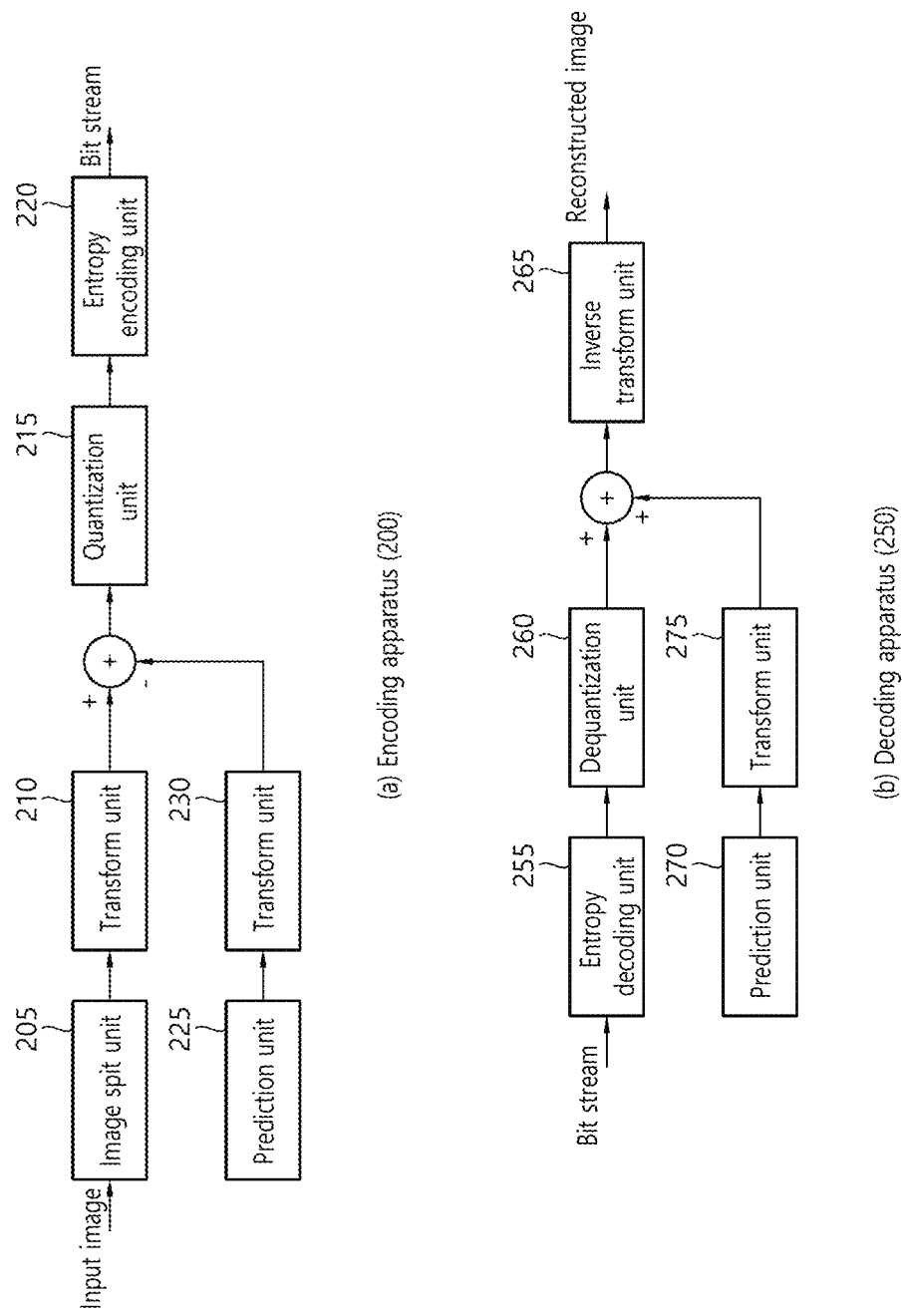
FIG. 2 illustrates an example of an encoding apparatus and a decoding apparatus which generate a prediction block in a frequency domain.

FIG. 2 illustrates an example of an encoding apparatus and a decoding apparatus which generate a prediction block in a frequency domain. Referring to FIG. 2(a), the encoding apparatus 200 may transform the original image and a prediction image in a frequency domain based on an intra prediction method in the frequency domain according to the present invention, and may generate an optimal frequency domain prediction block. Although a transform unit 230 and a prediction unit 225 have been illustrated as being separately configured in FIG. 2(a), this is an example, and the transform unit 230 may be included in the prediction unit 225.

Frequency domain residual information may be a difference between the original image and a prediction image in the frequency domain. The frequency domain residual information may be quantized through a quantization unit 215 and then encoded through an entropy encoding unit 220.

Referring to FIG. 2(b), the decoding apparatus 250 may reconstruct frequency domain residual information from a transmitted bit stream through an entropy decoding unit 255 and a dequantization unit 260. Furthermore, a transform unit 275 may derive a frequency domain prediction block by performing frequency transform on a prediction block generated by a prediction unit 270, and may generate a frequency domain reconstruction block based on the frequency domain residual information and the frequency domain prediction block. Furthermore, an inverse transform unit 265 may generate a reconstruction block in the spatial domain by performing frequency inverse transform on the frequency domain reconstruction block. Although the transform unit 275 and the prediction unit 270 have been illustrated as being separately configured in FIG. 2(b), this is an example, and the transform unit 276 may be included in the prediction unit 270.

Figure 3:
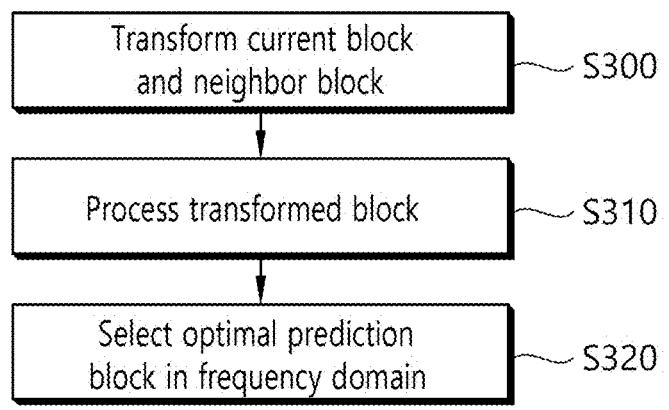
FIG. 3 illustrates an example of a frequency domain prediction block.

FIG. 3 illustrates an example of a frequency domain prediction block. Referring to FIG. 3, the coding apparatus may generate a frequency domain prediction block based on a current block in the spatial domain and a neighbor block of the current block. The coding apparatus may be the aforementioned encoding apparatus or decoding apparatus.

First, the coding apparatus may perform frequency transform on a current block and a neighbor block of the current block in the spatial domain into blocks on a frequency domain (S300). A frequency domain original block may be derived based on the current block, and a frequency domain neighbor block may be derived based on the neighbor block.

The coding apparatus may perform frequency domain processing on the frequency domain neighbor block (S310). That is, the coding apparatus may generate a frequency domain prediction block for the current block based on the frequency domain neighbor block. In this case, frequency domain prediction blocks corresponding to neighbor blocks may be generated based on a plurality of neighbor blocks in the spatial domain.

The coding apparatus may select an optimal frequency domain prediction block from the frequency domain prediction blocks (S320). The optimal frequency domain prediction block may be selected by the encoding apparatus based on a rate-distortion (RD) cost. Information about the optimal frequency domain prediction block may be signaled to the decoding apparatus through a bit stream. For example, the optimal frequency domain prediction block may be a frequency domain prediction block in which the amount of data of frequency residual information with the frequency original block is minimum.

Figure 4:
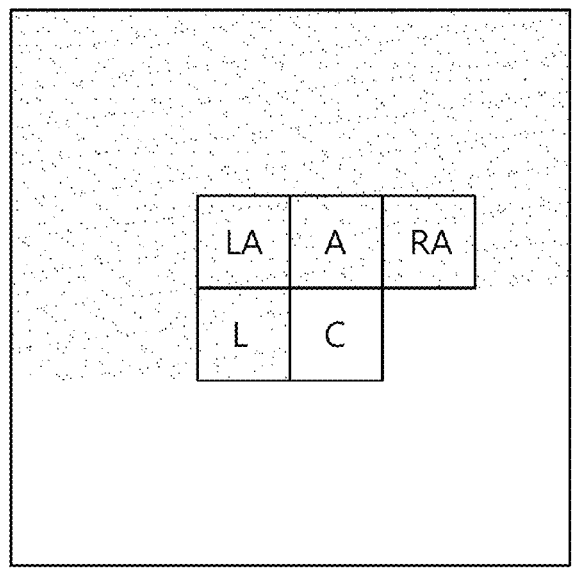
FIG. 4 illustrates an example of a current block and the neighbor blocks of the current block to which the present invention is applied.

FIG. 4 illustrates an example of a current block and the neighbor blocks of the current block to which the present invention is applied. A neighbor block of the current block in the spatial domain may be at least one of the neighbor blocks of the current block. As shown in FIG. 3, a frequency domain neighbor block may be derived by frequency-transforming the neighbor block of the spatial domain. The neighbor blocks of the spatial domain may include blocks that have the same size as the current block and that neighbor the current block, for example. For example, as shown in FIG. 4, the neighbor blocks may include at least one of a top neighbor block A, a left neighbor block L, a top-left neighbor block LA, and a top-right neighbor block RA. This is only an example, and the neighbor blocks may further include a neighbor block in addition to the top neighbor block A, the left neighbor block L, the top-left neighbor block LA, and the top-right neighbor block RA.

Furthermore, for example, the current block may be a TU, and the neighbor block may also be a TU. In this case, the current block may be called a current TU, and the neighbor block may be called a neighbor TU. Specifically, for example, if the size of the current TU is N×N, each neighbor block of the spatial domain may be transformed into the same N×N size as the current TU. Furthermore, the neighbor blocks may be selectively transformed. That is, for example, only the top neighbor block and the left neighbor block may be frequency-transformed or the top neighbor block, the left neighbor block, and the top-left neighbor block may be frequency-transformed. After frequency transform is performed on the current block and the neighbor blocks of the spatial domain, frequency domain processing may be performed on a frequency domain neighbor block derived based on the neighbor block of the spatial domain.

Figure 5:
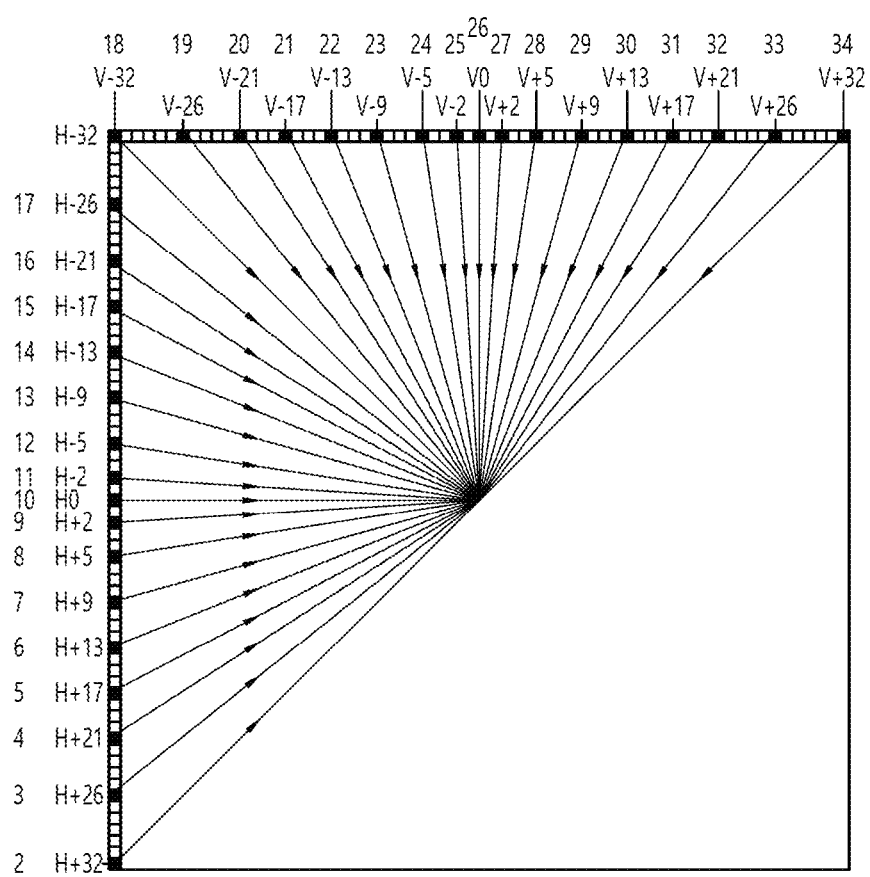
FIG. 5 illustrates an example of prediction directions of intra prediction mode in a spatial domain.

FIG. 5 illustrates an example of prediction directions of the intra prediction mode in the spatial domain. In the generation of a prediction block in the spatial domain, the prediction block may be generated by applying several prediction directions, as shown in FIG. 5. However, in the aforementioned intra prediction mode in the frequency domain, various frequency domain prediction blocks may be generated based on the characteristics of the frequency domain without applying the prediction directions. That is, the frequency domain prediction block may be generated based on a prediction pattern derived by taking into consideration a correlation between a frequency domain original block and a frequency domain prediction block.

Figure 6:
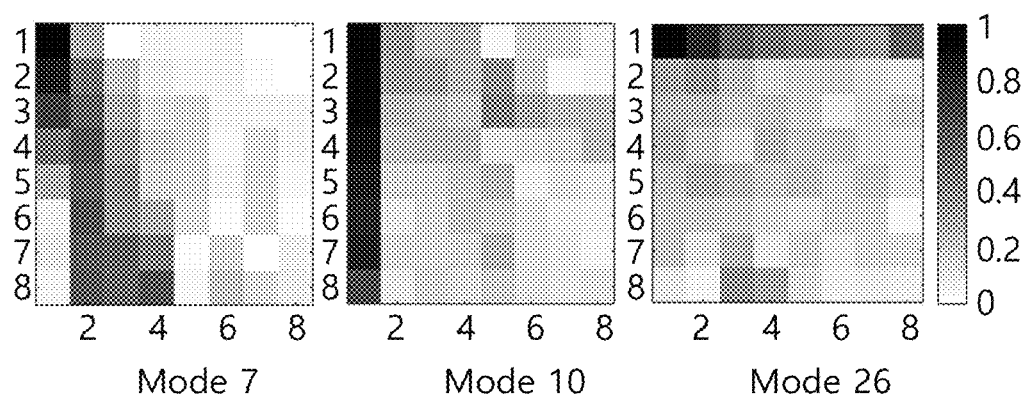
FIG. 6 illustrates an example of a correlation between the frequency components of a frequency domain original block and a frequency domain prediction block according to prediction directions of intra prediction modes.

FIG. 6 illustrates an example of a correlation between the frequency components of a frequency domain original block and a frequency domain prediction block according to prediction directions of intra prediction modes. Referring to FIG. 6, a correlation between frequency components may differently appear according to a prediction direction. In this case, a horizontal direction indicates an x axis in the frequency domain, and a vertical direction indicates a y axis in the frequency domain. The correlation is close to 1 as color is close to dark and is close to 0 as the color is close to white.

Various prediction pattern may be generated by taking into consideration that a correlation between frequency components is different depending on the prediction direction. A frequency domain neighbor block may be derived as a frequency domain prediction block based on a prediction pattern.

FIGS. 7A-7E illustrate an example of various prediction patterns for the processing of a frequency domain neighbor block. Frequency characteristics in the frequency domain may be changed by applying various prediction patterns, such as those shown in FIGS. 7A-7E, to a frequency domain neighbor block. In other words, the frequency characteristics of the frequency domain neighbor block may be changed. The prediction patterns of FIGS. 7A-7E are embodiments, and more various prediction patterns may be generated. A region indicated by a gray shadow in each prediction pattern may be a region in which the frequency component value of a frequency domain neighbor block corresponding to the location of the region remains intact without any change. The value of the prediction pattern component in the region may be 1. Furthermore, a region indicated by white in each prediction pattern may be a region in which the frequency component value of a frequency domain neighbor block corresponding to the location of the region is removed. The value of the prediction pattern component in the region may be 0.

The prediction pattern may be expressed as an equation. For example, the H(m,n) value of the prediction pattern of FIG. 7A may be derived based on the following equation.

$$H(m, n) = \begin{cases} 1, & \text{if } n \leq N/2 \\ 0, & \text{otherwise} \end{cases} \quad \text{[Equation 1]}$$

In this case, m indicates the coordinates of the prediction pattern in the vertical direction, and n indicates the coordinates of the prediction pattern in the horizontal direction. The H(m, n) values of various prediction patterns may be defined using a method similar to Equation 1. In this case, the coordinates of a top-left component may be indicated as H(0, 0).

Furthermore, the H(m,n) values of prediction patterns corresponding to FIGS. 7B, 7C, 7D, and 7E, respectively, may be derived using the following equations, for example.

$$H(m, n) = \begin{cases} 1, & \text{if } m \leq N/2 \\ 0, & \text{otherwise} \end{cases} \quad \text{[Equation 2]}$$

In this case, the H(m,n) value of the prediction pattern of FIG. 7B may be derived based on Equation 2, and the coordinates of a top-left component may be indicated as H(0, 0).

$$H(m, n) = \begin{cases} 1, & \text{if } m + n \leq N \\ 0, & \text{otherwise} \end{cases} \quad \text{[Equation 3]}$$

In this case, the H(m,n) value of the prediction pattern of FIG. 7C may be derived based on Equation 3, and the coordinates of a top-left component may be indicated as H(0, 0).

$$H(m, n) = \begin{cases} 1, & \text{if } m \leq 3N/4 \text{ and } n \leq 3N/4 \\ 0, & \text{otherwise} \end{cases} \quad \text{[Equation 4]}$$

In this case, the H(m,n) value of the prediction pattern of FIG. 7D may be derived based on Equation 4, and the coordinates of a top-left component may be indicated as H(0, 0).

$$H(m, n) = \begin{cases} 1, & \text{if } m + n \leq 3N/2 \\ 0, & \text{otherwise} \end{cases} \quad \text{[Equation 5]}$$

In this case, the H(m,n) value of the prediction pattern of FIG. 7E may be derived based on Equation 5, and the coordinates of a top-left component may be indicated H(0, 0).

Figure 8A:
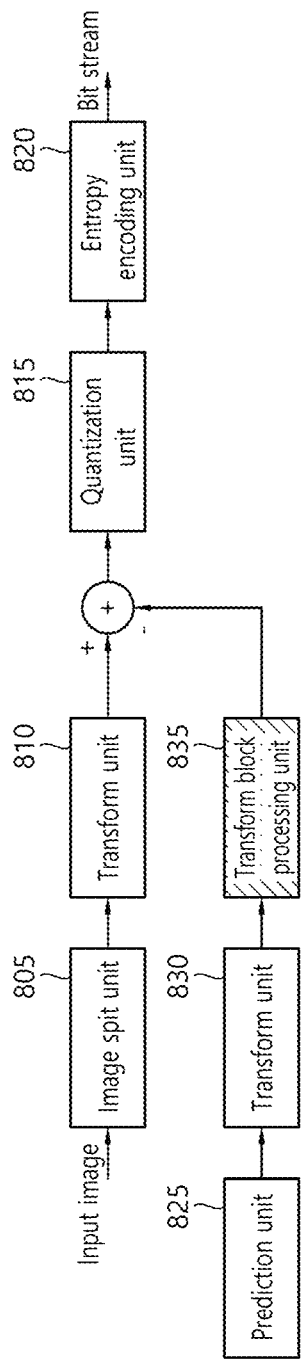
FIGS. 8A and 8B illustrate an example of an encoding apparatus and decoding apparatus including a transform block processing unit which generates a frequency domain prediction block based on a frequency domain neighbor block and a prediction pattern.
Figure 8B:
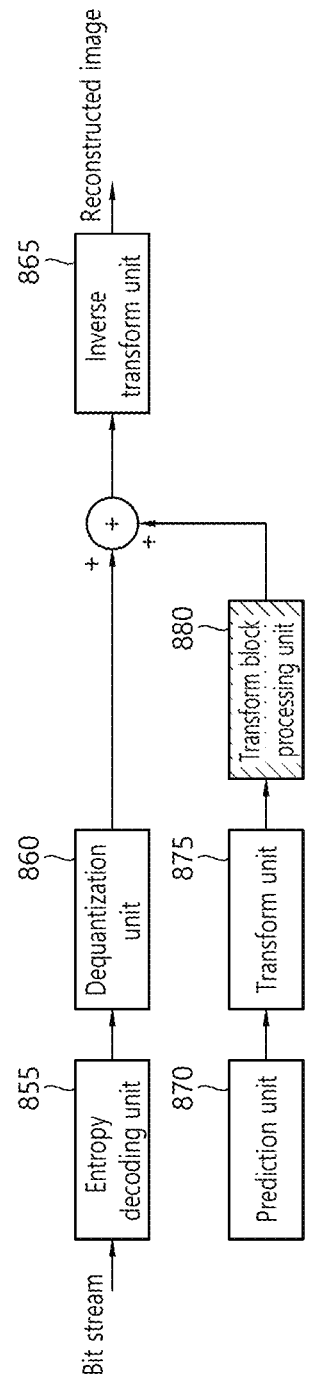

FIGS. 8A and 8B illustrate an example of an encoding apparatus and decoding apparatus including a transform block processing unit which generates a frequency domain prediction block based on a frequency domain neighbor block and a prediction pattern.

Referring to FIG. 8A, the encoding apparatus 800 may derive a frequency domain neighbor block by transforming the neighbor block of a current block in a spatial domain into a frequency domain through a transform unit 830, and may generate a new frequency domain prediction block by applying various prediction patterns, such as those shown in FIGS. 7A-7E, to the frequency domain neighbor block through a transform block processing unit 835. The encoding apparatus 800 may generate frequency domain residual information by calculating a difference between the value of the frequency domain prediction block and the value of the current block in the frequency domain of the original image. The frequency domain residual information may be quantized through a quantization unit 815 and subsequently encoded through an entropy encoding unit 820. Although the transform unit 830 and the transform block processing unit 835 have been illustrated as being configured separately from a prediction unit 825 in FIG. 8A, this is an example. The transform unit 830 and the transform block processing unit 835 may be included in the prediction unit 825.

Referring to FIG. 8B, the decoding apparatus 850 may reconstruct the frequency domain residual information from a received bit stream through an entropy decoding unit 855 and a dequantization unit 860. Furthermore, a frequency domain neighbor block may be derived by frequency-transforming a prediction block, generated through a prediction unit 870, through a transform unit 875. A new frequency domain prediction block may be generated by applying various prediction patterns, such as those shown in FIGS. 7A-7E, to the frequency domain neighbor block through a transform block processing unit 880.

A method of deriving the frequency domain prediction block by applying the prediction pattern may be expressed as the following equation, for example.

$$\tilde{P}_{proc}(m,n)=0 \text{ if } H(m,n)=0 \qquad \text{[Equation 6]}$$

In this case $\tilde{P}_{proc}(m, n)$ indicates the frequency domain prediction block to which the prediction pattern has been applied. The value of a frequency component of the frequency domain prediction block corresponding to the location where the component of the prediction pattern is 0 may be derived as 0.

In an intra prediction mode in the frequency domain, various frequency domain prediction blocks may be generated by applying various prediction patterns to a frequency domain neighbor block. A frequency domain prediction block that belongs to the frequency domain prediction blocks and that is most similar to the frequency characteristics of a current block may be derived as the frequency domain prediction block of the current block.

A decoding method based on information of the frequency domain prediction block may include the following. That is, the aforementioned intra prediction mode in the frequency domain may be indicated as methods of two structures, for example.

First, only the aforementioned intra prediction mode in the frequency domain may be used. In the intra prediction mode in the frequency domain proposed by the present invention, information about which neighbor block is selected can be encoded/decoded because a frequency domain prediction block is generated using information of neighbor blocks of the current block. That is, a neighbor block in a spatial domain that belongs to neighbor blocks in the spatial domain and that will derive a frequency domain neighbor block may be selected. The encoding apparatus may generate and encode an index indicative of the neighbor block of the spatial domain.

Furthermore, information about the selection of a prediction pattern that belongs to various predefined prediction pattern candidates and that is applied to the frequency domain neighbor block may be encoded/decoded. The encoding apparatus may generate and encode a prediction pattern index indicative of one prediction pattern of the prediction pattern candidates.

After selecting the prediction pattern of the current block as described above, the encoding apparatus may encode information about the selection of the prediction pattern and transmit the encoded information to the decoding apparatus. The information about the prediction pattern may be transmitted as a value itself indicative of the prediction pattern, but a method of transmitting information about the selection of a prediction pattern based on the prediction pattern applied to a neighbor block may be used to improve transmission efficiency.

In other words, if an intra prediction mode in a frequency domain is applied in order to improve coding efficiency, the information about the prediction pattern may be encoded using information about the prediction pattern of the neighbor block as in the encoding of information about the selection of a prediction mode of an intra prediction mode in the spatial domain. That is, the information about the prediction pattern may be encoded by applying the most probable pattern (MPP) mode.

The decoding apparatus may determine the prediction pattern depending on whether the MPP or the remaining mode is applied.

If the MPP mode is applied, an MPP list may be generated based on the prediction pattern of a first neighbor block and the prediction pattern of a second neighbor block of the current block. The MPP list may consist of a plurality of MPP candidates. That is, the encoding apparatus may derive a plurality of MPP candidates based on the prediction pattern of a plurality of neighbor blocks neighboring the current block, and may allocate the derived MPP candidates to the MPP list. In this case, the encoding apparatus may use the prediction pattern of a neighbor block as an MPP candidate corresponding to the neighbor block without any change, or may use a separate prediction pattern determined based on a specific condition as an MPP candidate corresponding to the neighbor block. For example, the first neighbor block may be the left neighbor block of the current block, and the second neighbor block may be the top neighbor block of the current block. The MPP list may include prediction patterns and may include a prediction pattern of the current block.

The decoding apparatus may determine the prediction pattern of the current block based on the MPP list. In this case, the decoding apparatus may obtain an MPP index from the bit stream, and may derive the prediction pattern of a candidate that belongs to candidates within the MPP list and that is indicated by the MPP index as the prediction pattern of the current block. Alternatively, if the remaining mode is applied, the decoding apparatus may obtain information indicative of a specific one of the remaining prediction patterns not included in the MPP list from the bit stream, and may derive the prediction pattern of the current block based on the information indicative of the specific prediction pattern.

Meanwhile, the decoding apparatus may obtain a flag indicating whether the MPP mode is applied through the bit stream. The flag may also be called a previous intra luma pattern flag. If the value of the previous intra luma pattern flag is 1, the decoding apparatus may obtain the MPP index through the bit stream. If the value of the previous intra luma pattern flag is 0, the decoding apparatus may obtain the remaining intra luma prediction pattern information indicative of one of the remaining prediction patterns through the bit stream.

If only the intra prediction mode in the frequency domain is used as in the aforementioned contents, the index indicative of the neighbor block of the spatial domain, the previous intra luma pattern flag, the MPP index, and the remaining intra luma prediction pattern information may be transmitted through a syntax, such as Table 1.

TABLE 1

| coding unit( x0, y0, log2CbSize ) { | Descriptor |
| --- | --- |
|   if( transquant bypass enabled flag ) | |
|     cu_transquant_bypass_flag | ae(v) |
|   if( slice type != I ) | |
|     cu_skip_flag[ x0 ][ y0 ] | ae(v) |

TABLE 1-continued

| coding unit( x0, y0, log2CbSize ) { | Descriptor |
|---|---|
|   nCbS = ( 1 << log2CbSize ) | |
|   if( cu_skip_flag[ x0 ][ y0 ] ) | |
|     prediction_unit( x0, y0, nCbS, nCbS ) | |
|   else { | |
|     if( slice_type != I ) | |
|       pred_mode_flag | ae(v) |
|     if( CuPredMode[ x0 ][ y0 ] != MODE_INTRA \|\| log2CbSize == MinCbLog2SizeY ) | |
|       part_mode | ae(v) |
|     if( CuPredMode[ x0 ][ y0 ] == MODE_INTRA ) { | |
|       if( PartMode == PART_2Nx2N && pcm_enabled_flag && | |
|         log2CbSize >= Log2MinIpcmCbSizeY && | |
|         log2CbSize <= Log2MaxIpcmCbSizeY ) | |
|         pcm_flag[ x0 ][ y0 ] | ae(v) |
|       if( pcm_flag[ x0 ][ y0 ] ) { | |
|         while( !byte aligned( ) ) | |
|           pcm_alignment_zero_bit | f(l) |
|         pcm sample( x0, y0, log2CbSize ) | |
|       } else { | |
|         pbOffset = ( PartMode == PART NxN ) ? ( nCbS / 2 ) : nCbS | |
|         for( j = 0; j < nCbS; j = j + pbOffset ) | |
|           for( i = 0; i < nCbS; i = i + pbOffset ) | |
|             neighbor_blk_index [ x0 + i ][ y0 + j ] | ae(v) |
|         for( j = 0; j < nCbS; j = j + pbOffset ) | |
|           for( i = 0; i < nCbS; i = i + pbOffset ) | |
|             ~~prev_intra_luma_pred_flag[ x0 + i ][ y0 + j ]~~ | ~~ae(v)~~ |
|             prev_intra_luma_pattern_flag[ x0 + i ][ y0 + j ] | ae(v) |
|         for( j = 0; j < nCbS; j = j + pbOffset ) | |
|           for( i = 0; i < nCbS; i = i + pbOffset ) | |
|             ~~if( prev_intra_luma_pred_flag[ x0 + i ][ y0 + j ] )~~ | |
|             if( prev intra luma pattern flag[ x0 + i ][ y0 + j ] ) | |
|               ~~mpm_idx[ x0 + i ][ y0 + j ]~~ | ~~ae(v)~~ |
|               mpp_idx[ x0 + i ][ y0 + j ] | ae(v) |
|             else | |
|               ~~rem_intra_luma_pred_mode[ x0 + i ][ y0 + j ]~~ | ~~ae(v)~~ |
|               rem intra luma pred pattern[ x0 + i ][ y0 + j ] | ae(v) |
|         ~~intra_luma_pred_mode[ x0 + i ][ y0 + j ]~~ | ~~ae(v)~~ |
|         intra_chroma_pred_pattern[ x0 ][ y0 ] | ae(v) |
|       } | |
|     } else { | |
|     ... | |
|     } | |

Referring to Table 1, the neighbor_blk_index syntax element may correspond to an index indicative of the neighbor block in the spatial domain. The prev_intra_luma_pattern_flag syntax element may correspond to the pervious intra pattern flag. The mpp_idx syntax element may correspond to the MPP index. The rem_intra_luma_pred_pattern syntax element may correspond to the remaining intra luma prediction pattern information.

Second, the intra prediction mode in the spatial domain and the intra prediction mode in the frequency domain may be interchangeably used. In this case, the encoding apparatus may select that which one of the intra prediction mode in the spatial domain and the intra prediction mode in the frequency domain in a higher level of a CU level or CU level will be applied to the current block, and may generate and encode a flag indicating the selection of the mode. The flag may be called a frequency domain intra flag. The frequency domain intra flag may be transmitted through a syntax, such as Table 2.

TABLE 2

| coding unit( x0, y0, log2CbSize ) { | Descriptor |
|---|---|
|   if( transquant bypass enabled flag ) | |
|     cu transquant bypass flag | ae(v) |
|   if( slice type != I ) | |
|     cu skip flag[ x0 ][ y0 ] | ae(v) |
|   nCbS = ( 1 << log2CbSize ) | |
|   if( cu skip flag[ x0 ][ y0 ] ) | |
|     prediction unit( x0, y0, nCbS, nCbS ) | |
|   else { | |
|     if( slice type != I ) | |
|       pred mode flag | ae(v) |
|     if( CuPredMode[ x0 ][ y0 ] != MODE_INTRA \|\| log2CbSize == MinCbLog2SizeY ) | |
|       part mode | ae(v) |
|     if( CuPredMode[ x0 ][ y0 ] == MODE INTRA ) { | |
|       if( PartMode == PART_2Nx2N && pcm_enabled_flag && | |
|         log2CbSize >= Log2MinIpcmCbSizeY && | |
|         log2CbSize <= Log2MaxIpcmCbSizeY ) | |

TABLE 2-continued

| coding unit( x0, y0, log2CbSize ) { | Descriptor |
|---|---|
|     pcm flag[ x0 ][ y0 ] | ae(v) |
|     if( pcm flag[ x0 ][ y0 ] ) { | |
|         while( !byte aligned( ) ) | |
|             pcm alignment zero bit | f(1) |
|         pcm sample( x0, y0, log2CbSize ) | |
|     } else { | |
|         pbOffset = ( PartMode == PART NxN) ? ( nCbS / 2 ) : nCbS | |
|         for( j = 0; j < nCbS; j = j + pbOffset ) | |
|             for( i = 0; i < nCbS; i = i + pbOffset ) | |
|                 frequency domain intra flag [ x0 + i ][ y0 + j ] | ae(v) |
|         if (frequency domain intra flag [ x0 + i ][ y0 + j ]) { | |
|         for( j = 0; j < nCbS; j = j + pbOffset ) | |
|             for( i = 0; i < nCbS; i = i + pbOffset ) | |
|                 neighbor blk index [ x0 + i ][ y0 + j ] | ae(v) |
|         for( i = 0; j < nCbS; j = j + pbOffset ) | |
|             for( i = 0; i < nCbS; i = i + pbOffset ) | |
|                 prev intra luma pattern flag[ x0 + i ][ y0 + j ] | ae(v) |
|         for( j = 0; i < nCbS; j = j + pbOffset ) | |
|             for( i = 0; i < nCbS; i = i + pbOffset ) | |
|                 if( prev intra luma pattern flag[ x0 + i ][ y0 + j ] ) | |
|                     mpp idx[ x0 + i ][ y0 + j ] | ae(v) |
|                 else | |
|                     rem intra luma pred pattern[ x0 + i ][ y0 + j ] | ae(v) |
|         intra chroma pred pattern[ x0 ][ y0 ] | ae(v) |
|         } | |
|     else { | |
|         for( j = 0; i < nCbS; j = j + pbOffset ) | |
|             for( i = 0; i < nCbS; i = i + pbOffset ) | |
|                 prev intra luma pred flag[ x0 + i ][ y0 + j ] | ae(v) |
|         for( j = 0; j < nCbS; j = j + pbOffset ) | |
|             for( i = 0; i < nCbS; i = i + pbOffset ) | |
|                 if( prev intra luma pred flag[ x0 + i ][ y0 + i ] ) | |
|                     mpm idx[ x0 + i ][ y0 + j ] | ae(v) |
|                 else | |
|                     rem intra luma pred mode[ x0 + i ][ y0 + j ] | ae(v) |
|         intra chroma pred mode[ x0 ][ y0 ] | ae(v) |
|     } | |
|     } else { | |
| .... | |
|     } | |

Referring to Table 2, the frequency_domain_intra_flag syntax element may correspond to the frequency domain intra flag.

Figure 9:
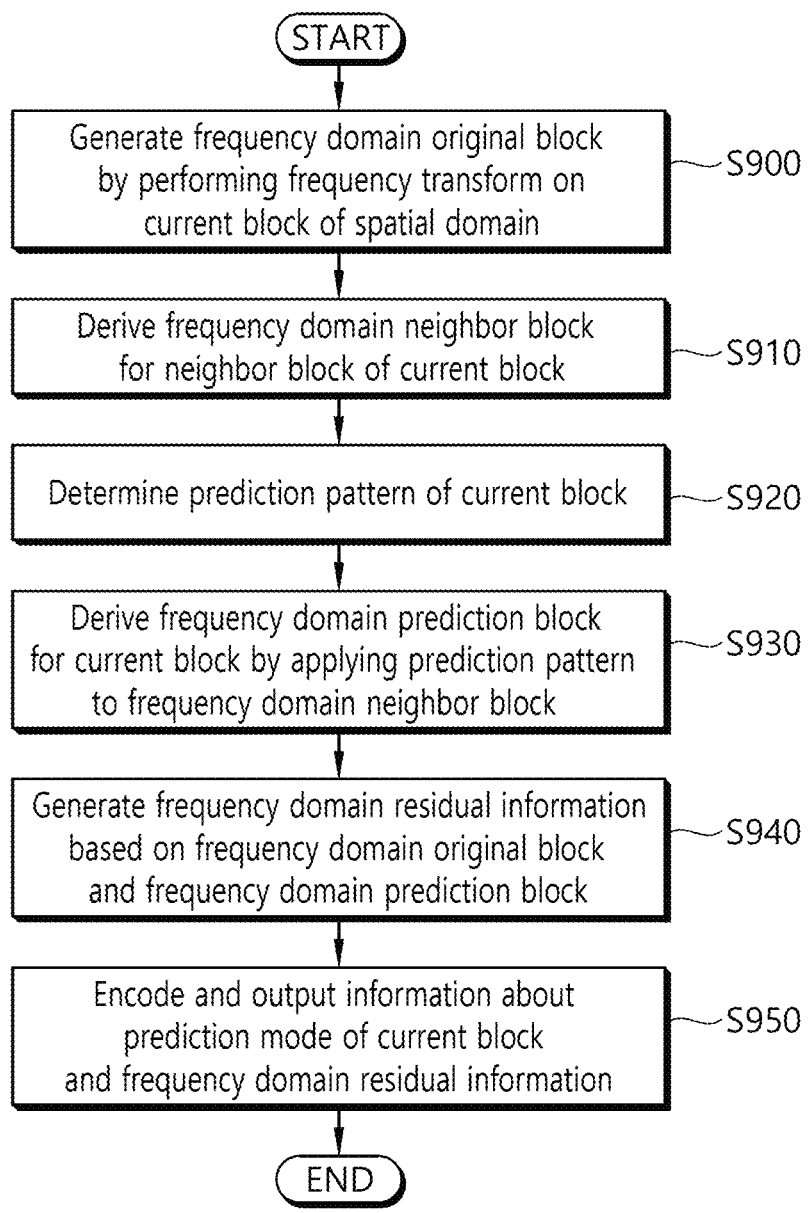
FIG. 9 schematically shows the image encoding method of the encoding apparatus according to the present invention.

FIG. 9 schematically shows the image encoding method of the encoding apparatus according to the present invention. The method disclosed in FIG. 9 may be performed by the encoding apparatus disclosed in FIGS. 8A and 8B. Specifically, for example, in FIG. 9, S900 to S910 may be performed by the transform unit of the encoding apparatus, S920 to S940 may be performed by the transform block processing unit of the encoding apparatus, and S950 may be performed by the entropy encoding unit of the encoding apparatus. Alternatively, the prediction unit of the encoding apparatus may include the transform unit and the transform block processing unit. In this case, S900 to S940 of FIG. 9 may be performed by the prediction unit of the encoding apparatus.

The encoding apparatus generates a frequency domain original block by performing frequency transform on a current block in a spatial domain (S900). The encoding apparatus may frequency-transform the current block of the spatial domain. The encoding apparatus may generate a frequency domain original block based on a frequency component corresponding to the current block in the frequency domain.

The encoding apparatus derives a frequency domain neighbor block for a neighbor block of the current block (S910). The neighbor block may be determined to be at least one of the neighbor blocks of the current block. For example, the neighbor blocks may include at least one of the top neighbor block, left neighbor block, top-left neighbor block, and top-right neighbor block of the current block. This is an example, and the neighbor blocks may include a neighbor block in addition to the top neighbor block, the left neighbor block, the top-left neighbor block, and the top-right neighbor block.

Specifically, for example, the neighbor block may be determined to be the top neighbor block and the left neighbor block. For another example, the neighbor block may be determined to be the top neighbor block, the left neighbor block, and the top-left neighbor block.

The encoding apparatus may derive the frequency domain neighbor block corresponding to the neighbor block by frequency-transforming the neighbor block. The encoding apparatus may perform frequency transform on the neighbor block in the same size as that of the current block. For example, if the size of the current block is N×N, the encoding apparatus may perform frequency transform on the neighbor block in the N×N size, and may derive the frequency domain neighbor block of the N×N size.

Meanwhile, the encoding apparatus may generate an index indicative of the neighbor block in the spatial domain on which the frequency transform is performed.

The encoding apparatus determines a prediction pattern of the current block (S920). The encoding apparatus may derive the prediction pattern by taking into consideration a correlation between the frequency component of the frequency domain original block and the frequency component of the frequency domain prediction block. The value of the component of the prediction pattern may be any one of 0 and 1. The encoding apparatus may generate various prediction patterns by taking into consideration that a correlation between frequency components is different depending on a prediction direction. Specifically, for example, the encoding apparatus may derive the prediction pattern based on Equation 1 or 2 if the size of the frequency domain neighbor block and the prediction pattern is N×N and the coordinates of the top-left component of the prediction pattern are (0,0).

Meanwhile, the encoding apparatus may configure prediction pattern candidates based on the prediction pattern of the neighbor block. The encoding apparatus may determine one of the prediction pattern candidates to be the prediction pattern of the current block. In this case, the encoding apparatus may generate a prediction pattern index indicative of the prediction pattern candidate determined to be the prediction pattern of the current block. Furthermore, the encoding apparatus may generate the prediction pattern index by applying the most probable pattern (MPP) mode.

For example, the encoding apparatus may generate an MPP list based on the prediction pattern of a first neighbor block and prediction pattern of a second neighbor block of the current block in the spatial domain. The first neighbor block may be the left neighbor block of the current block, and the second neighbor block may be the top neighbor block of the current block. The MPP list may include prediction patterns and include the prediction pattern of the current block. The encoding apparatus may generate an MPP index indicative of the prediction pattern of the current block. Furthermore, the MPP index may not be included in the MPP list of the current block. In this case, the encoding apparatus may generate information indicative of a specific one of the remaining prediction patterns not included in the MPP list. The information may be called the remaining intra luma pattern information.

The encoding apparatus derives a frequency domain prediction block for the current block by applying prediction pattern to the frequency domain neighbor block (S930). The frequency domain prediction block may be derived by multiplying a frequency component of the frequency domain neighbor block by the value of a component within the prediction pattern at a location corresponding to the frequency component. The value of the component within the prediction pattern may be any one of 0 and 1. The value of the frequency prediction block corresponding to the location where the value of the component within the prediction pattern is 0 may be derived as 0. In this case, the value of the frequency domain prediction block may be derived based on Equation 6.

The encoding apparatus generates frequency domain residual information based on the frequency domain original block and the frequency domain prediction block (S940). The encoding apparatus may generate a difference value between samples according to the phases of the frequency domain original block and the frequency domain prediction block, that is, the frequency domain residual information.

The encoding apparatus outputs information about the prediction mode of the current block and the frequency domain residual information by encoding them (S950). The encoding apparatus may generate a flag indicating whether the intra prediction mode of the current block in the frequency domain has been applied, that is, whether the frequency domain prediction block of the current block has been generated, may encode the flag, and may output the encoded flag in the form of a bit stream. The flag may be called a frequency domain intra flag. Furthermore, the encoding apparatus may generate index information indicative of the neighbor block in the spatial domain, may encode the index information, and may output the encoded index information in the form of a bit stream. Furthermore, the encoding apparatus may generate a previous intra luma pattern flag, may encode the previous intra luma pattern flag, and may output the encoded previous intra luma pattern flag in the form of a bit stream. Furthermore, the encoding apparatus may generate an MPP index, may encode the MPP index, and may output the encoded MPP index in the form of a bit stream. Furthermore, the encoding apparatus may generate remaining intra luma prediction pattern information, may encode the remaining intra luma prediction pattern information, and may output the encoded remaining intra luma prediction pattern information in the form of a bit stream. The prediction mode information, the frequency domain intra flag, the index information indicative of the neighbor block, the previous intra luma pattern flag, the MPP index, the remaining intra luma prediction pattern information, and the frequency domain residual information may be transmitted to the decoding apparatus in the form of a bit stream. The bit stream may be transmitted to the decoding apparatus over a network or through a storage medium.

Although not shown, the encoding apparatus may generate a frequency domain reconstruction block for the current block based on the frequency domain prediction block and the frequency domain residual information. The encoding apparatus may generate the reconstruction block of the spatial domain for the current block based on frequency inverse transform for the frequency domain reconstruction block. The generated frequency domain reconstruction block and/or reconstruction block of the spatial domain may be stored in the memory and may be subsequently used for intra prediction and/or inter prediction.

Figure 10:
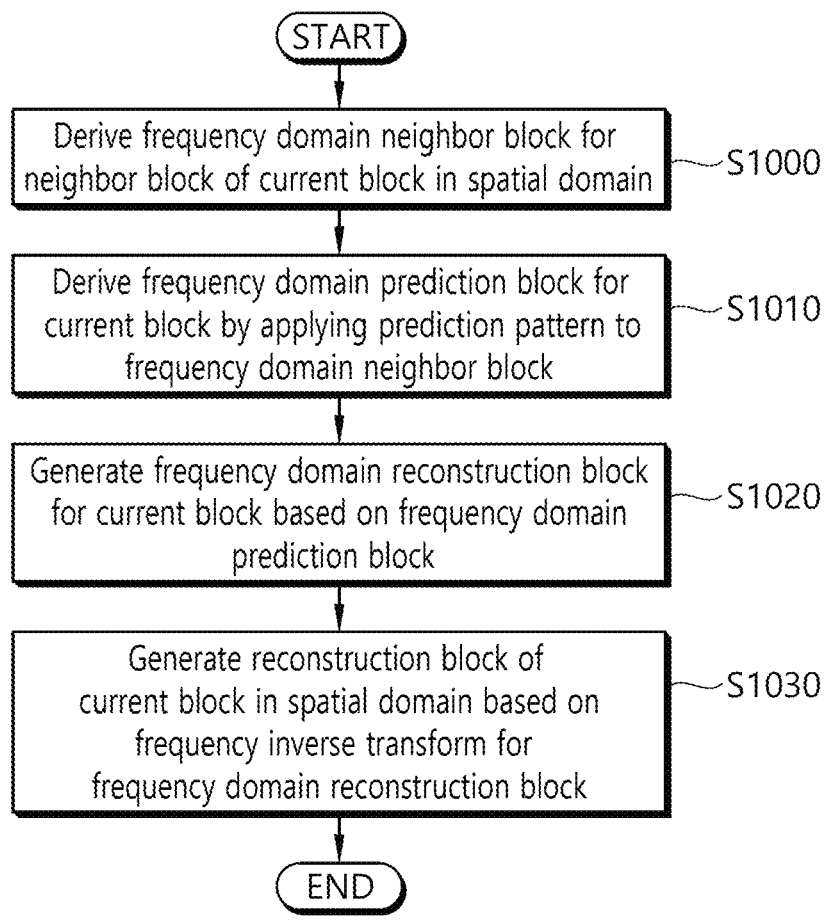
FIG. 10 schematically shows the image decoding method of the decoding apparatus according to the present invention.

FIG. 10 schematically shows the image decoding method of the decoding apparatus according to the present invention. The method disclosed in FIG. 10 may be performed by the decoding apparatus disclosed in FIGS. 8A and 8B. Specifically, for example, in FIG. 10, S1000 may be performed by the transform unit of the decoding apparatus, S1010 to S1020 may be performed by the transform block processing unit of the decoding apparatus, and S1030 may be performed by the inverse transform unit of the decoding apparatus. Alternatively, the prediction unit of the decoding apparatus may include the transform unit and the transform block processing unit. In this case, S1000 to S1020 of FIG. 10 may be performed by the prediction unit of the decoding apparatus.

The decoding apparatus derives a frequency domain neighbor block for a neighbor block of a current block in a spatial domain (S1000). The neighbor block may be determined to be at least one of the neighbor blocks of the current block. For example, the neighbor blocks of the current block in the spatial domain may include at least one of the top neighbor block, left neighbor block, top-left neighbor block, and top-right neighbor block of the current block. This is an example, and the neighbor blocks may further include a neighbor block in addition to the top neighbor block, the left neighbor block, the top-left neighbor block, and the top-right neighbor block.

Specifically, for example, the top neighbor block and the left neighbor block may be derived as the neighbor block. For another example, the top neighbor block, the left neighbor block, and the top-left neighbor block may be derived as the neighbor block.

The decoding apparatus may derive the frequency domain neighbor block that is frequency-transformed from the neighbor block and that corresponds to the neighbor block. The frequency domain neighbor block may be derived as a block having the same size as the current block. For example, if the current block has an N×N size, the frequency domain neighbor block of the N×N size may be derived.

Meanwhile, the decoding apparatus may obtain an index indicative of the neighbor block in the spatial domain through a bit stream. In this case, the decoding apparatus may derive the frequency domain neighbor block corresponding to the neighbor block indicated by the index.

The decoding apparatus derives a frequency domain prediction block for the current block by applying a prediction pattern to the frequency domain neighbor block (S1010). The decoding apparatus may derive the prediction pattern of the current block. The prediction pattern may be derived based on a preset prediction pattern and may be derived based on the prediction pattern of the neighbor block of the current block. The prediction pattern may have the same size as the frequency domain neighbor block, and the value of a component of the prediction pattern may be one of 0 and 1. The prediction pattern may be expressed into an equation. Specifically, if the size of the frequency domain neighbor block and the prediction pattern is N×N and the coordinates of the top-left component of the prediction pattern are (0,0) the prediction pattern may be expressed like Equation 1 or 2.

Furthermore, the decoding apparatus may configure prediction pattern candidates based on the prediction pattern of the neighbor block. The decoding apparatus may obtain a prediction pattern index indicative of one of the prediction pattern candidates through the bit stream. The decoding apparatus may derive the prediction pattern of the current block based on the prediction pattern candidate indicated by the prediction pattern index.

Furthermore, the decoding apparatus may generate an MPP list if the most probable pattern (MPP) mode is applied. For example, the decoding apparatus may generate the MPP list based on the prediction pattern of a first neighbor block and prediction pattern of a second neighbor block of the current block in the spatial domain. The first neighbor block may be the left neighbor block of the current block, and the second neighbor block may be the top neighbor block of the current block. The MPP list may include prediction patterns, and may include the prediction pattern of the current block.

In this case, the decoding apparatus may obtain an MPP index indicative of a prediction pattern included in the MPP list through the bit stream. The decoding apparatus may derive the prediction pattern of the current block based on the prediction pattern indicated by the MPP index. Furthermore, the decoding apparatus may obtain information indicative of a specific one of the remaining prediction patterns not included in the MPP list through the bit stream. The information may be called remaining intra luma pattern information. The decoding apparatus may derive the prediction pattern of the current block based on the remaining intra luma pattern information.

The decoding apparatus may derive the frequency domain prediction block by multiplying a frequency component of the frequency domain neighbor block by the value of a component within a prediction pattern at a location corresponding to the frequency component. The value of the component within the prediction pattern may be one of 0 and 1. The value of a frequency prediction block corresponding to the location where the value of the component within the prediction pattern is 0 may be derived as 0. In this case, the value of the frequency domain prediction block may be derived based on Equation 6.

Meanwhile, the decoding apparatus may obtain a frequency domain intra flag through the bit stream. The decoding apparatus may determine whether to derive the frequency domain prediction block based on the value of the frequency domain intra flag. The frequency domain intra flag may indicate whether the intra prediction mode of the current block in the frequency domain has been applied, that is, whether the frequency domain prediction block of the current block has been generated. For example, if the value of the frequency domain intra flag is 1, the decoding apparatus may derive the frequency domain prediction block for the current block. Furthermore, if the value of the frequency domain intra flag is 0, the decoding apparatus may not derive the frequency domain prediction block for the current block.

The decoding apparatus generates a frequency domain reconstruction block for the current block based on the frequency domain prediction block (S1020). The decoding apparatus may obtain frequency domain residual information for the current block through the bit stream. The frequency domain residual information may be a difference value between samples according to the phases of a frequency domain original block and the frequency domain prediction block. The decoding apparatus may generate the frequency domain reconstruction block for the current block based on the frequency domain prediction block and the frequency domain residual information.

The decoding apparatus generates the reconstruction block of the current block in the spatial domain based on frequency inverse transform for the frequency domain reconstruction block (S1030). The decoding apparatus may generate the reconstruction block of the spatial domain by performing frequency inverse transform on the frequency domain reconstruction block. The decoding apparatus may generate a reconstruction picture based on the reconstruction block. The generated frequency domain reconstruction block and/or the generated reconstruction block of the spatial domain may be stored in the memory and may be subsequently used for intra prediction and/or inter prediction.

In accordance with the present invention, the prediction block of a current block in a frequency domain can be generated, and the reconstruction of a complicated image can become more efficient.

Furthermore, in accordance with the present invention, a prediction pattern can be derived based on neighbor blocks, and a prediction block similar to the current block can be derived through the prediction pattern. Accordingly, the amount of data of frequency residual information of the current block can be obviated or reduced, and overall coding efficiency can be improved.

In the aforementioned embodiments, although the methods have been described based on the flowcharts in the form of a series of steps or blocks, the present invention is not limited to the sequence of the steps, and some of the steps may be performed in the sequence different from that of other steps or may be performed simultaneously with other steps. Furthermore, those skilled in the art will understand that the steps shown in the flowchart are not exclusive and the steps may include additional steps or that one or more steps in the flowchart may be deleted without affecting the range of right of the present invention.

The method according to the present invention described above may be implemented in software. The encoding device and/or decoding device according to the present invention may be included in a device that performs image processing, for example, for a TV, a computer, a smart phone, a set-top box, or a display device.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may include an application-specific integrated circuit (ASIC), other chipsets, a logic circuit and/or a data processing device. The memory may include read-only memory (ROM), random access memory (RAM), flash memory, a memory card, a storage medium and/or other storage devices.

What is claimed is:

1. An image decoding method performed in a video decoding apparatus, comprising steps of:
    deriving a frequency domain neighbor block for a neighbor block of a current block in a spatial domain;
    deriving a frequency domain prediction block for the current block by applying a prediction pattern to the frequency domain neighbor block;
    generating a frequency domain reconstruction block for the current block based on the frequency domain prediction block; and
    generating a reconstruction block for the current block in the spatial domain based on frequency inverse transform for the frequency domain reconstruction block,
    wherein the frequency domain prediction block is derived by multiplying a frequency component of the frequency domain neighbor block by a value of a component within the prediction pattern at a location corresponding to the frequency component, and the value of the component within the prediction pattern is one of 0 and 1.

2. The image decoding method of claim 1, wherein the neighbor block of the spatial domain comprises at least one of a top neighbor block, left neighbor block, top-left neighbor block, and top-right neighbor block of the current block.

3. The image decoding method of claim 1, further comprising a step of obtaining index information indicative of the neighbor block of the spatial domain through a bit stream,
    wherein the neighbor block of the spatial domain is determined to be one of neighbor blocks comprising a top neighbor block, left neighbor block, top-left neighbor block, and top-right neighbor block of the current block, and
    the frequency domain neighbor block is derived based on the neighbor block belonging to the neighbor blocks and indicated by the index information.

4. The image decoding method of claim 1, wherein the frequency domain neighbor block is derived as a block having a size identical with a size of the current block.

5. The image decoding method of claim 1, wherein, based on a size of the frequency domain neighbor block and the prediction pattern being N×N and coordinates of a top-left component of the prediction pattern being (0,0), the prediction pattern is derived based on an equation below, $$H(m, n) = \begin{cases} 1, & \text{if } n \leq N/2 \\ 0, & \text{otherwise} \end{cases}$$

wherein m indicates coordinates of the prediction pattern in a vertical direction and n indicates coordinates of the prediction pattern in a horizontal direction.

6. The image decoding method of claim 1, further comprising steps of:
    configuring prediction pattern candidates based on a prediction pattern of the neighbor block; and
    obtaining a prediction pattern index through a bit stream,
    wherein the prediction pattern is derived based on a prediction pattern candidate belonging to the prediction pattern candidates and indicated by the prediction pattern index.

7. The image decoding method of claim 1, further comprising steps of:
    generating a most probable pattern (MPP) list based on a prediction pattern of a first neighbor block and prediction pattern of a second neighbor block of the current block in the spatial domain; and
    obtaining an MPP index through a bit stream,
    wherein the MPP list comprises prediction patterns, and a specific prediction pattern belonging to the prediction patterns of the MPP list and indicated by the MPP index is derived as the prediction pattern of the current block.

8. The image decoding method of claim 7, further comprising a step of obtaining a previous intra luma pattern flag from the bit stream,
    wherein if a value of the previous intra luma pattern flag is 1, the MPP index is obtained through the bit stream.

9. The image decoding method of claim 8, wherein:
    based on the value of the previous intra luma pattern flag being 0, remaining intra luma prediction pattern information is obtained from the bit stream, and
    the remaining intra luma prediction pattern information indicates one of remaining prediction patterns other than the prediction patterns of the MPP list.

10. The image decoding method of claim 1, further comprising a step of obtaining a frequency domain intra flag through a bit stream,
    wherein if a value of the frequency domain intra flag is 1, the frequency domain prediction block for the current block is derived.

11. The image decoding method of claim 1, further comprising a step of obtaining frequency domain residual information for the current block through a bit stream,
    wherein the frequency domain reconstruction block is generated based on the frequency domain prediction block and the frequency domain residual information.

12. An image encoding method performed in an image encoding apparatus, comprising steps of:
    generating a frequency domain original block by performing frequency transform on a current block of a spatial domain;
    deriving a frequency domain neighbor block for a neighbor block of the current block;
    determining a prediction pattern of the current block;
    deriving a frequency domain prediction block for the current block by applying the prediction pattern to the frequency domain neighbor block;
    generating frequency domain residual information based on the frequency domain original block and the frequency domain prediction block; and
    encoding information about a prediction mode of the current block and the frequency domain residual information and outputting the encoded information,
    wherein the frequency domain prediction block is derived by multiplying a frequency component of the frequency domain neighbor block by a value of a component within the prediction pattern at a location corresponding to the frequency component, and the value of the component within the prediction pattern is one of 0 and 1.

13. The image encoding method of claim 12, wherein:
the frequency domain residual information is a difference value between samples according to phases of the frequency domain original block and the frequency domain prediction block, and
the prediction pattern is a prediction pattern deriving a frequency domain prediction block in which an amount of data of the frequency domain residual information is minimized.

14. The image encoding method of claim 12, wherein, based on a size of the frequency domain neighbor block and the prediction pattern being N×N and coordinates of a top-left component of the prediction pattern being (0,0), the prediction pattern is derived based on an equation below, $$H(m, n) = \begin{cases} 1, & \text{if } n \leq N/2 \\ 0, & \text{otherwise} \end{cases}$$

wherein m indicates coordinates of the prediction pattern in a vertical direction and n indicates coordinates of the prediction pattern in a horizontal direction.

15. The image encoding method of claim 12, further comprising steps of:
configuring prediction pattern candidates based on a prediction pattern of the neighbor block; and
obtaining a prediction pattern index through a bit stream,
wherein the prediction pattern is derived based on a prediction pattern candidate belonging to the prediction pattern candidates and indicated by the prediction pattern index.

16. The image encoding method of claim 12, further comprising steps of:
generating a most probable pattern (MPP) list based on a prediction pattern of a first neighbor block and prediction pattern of a second neighbor block of the current block in the spatial domain; and
obtaining an MPP index through a bit stream,
wherein the MPP list comprises prediction patterns, and
wherein a specific prediction pattern belonging to the prediction patterns of the MPP list and indicated by the MPP index is derived as the prediction pattern of the current block.

17. The image encoding method of claim 16, further comprising a step of obtaining a previous intra luma pattern flag from the bit stream,
wherein, based on a value of the previous intra luma pattern flag being 1, the MPP index is obtained through the bit stream.

18. The image encoding method of claim 17, wherein:
based on the value of the previous intra luma pattern flag being 0, remaining intra luma prediction pattern information is obtained from the bit stream, and
the remaining intra luma prediction pattern information indicates one of remaining prediction patterns other than the prediction patterns of the MPP list.

* * * * *